US006971777B2

(12) United States Patent
Casses et al.

(10) Patent No.: US 6,971,777 B2
(45) Date of Patent: Dec. 6, 2005

(54) AUTOMOTIVE LAMP UNIT INCORPORATING A PIVOT ELEMENT SUPPORTED ON THE HOUSING

(75) Inventors: Daniel Casses, Bobigny Cedex (FR); Jean Masse, Bobigny Cedex (FR)

(73) Assignee: Valeo Vision, Bobigny Cedex (FR)

(*) Notice: Subject to any disclaimer, the term of this patent is extended or adjusted under 35 U.S.C. 154(b) by 229 days.

(21) Appl. No.: 10/677,407

(22) Filed: Oct. 1, 2003

(65) Prior Publication Data

US 2004/0066657 A1 Apr. 8, 2004

(30) Foreign Application Priority Data

Oct. 2, 2002 (FR) .................................. 02 12206

(51) Int. Cl.[7] .................... F21V 14/04; F21V 14/02; F21V 7/00
(52) U.S. Cl. ..................... 362/515; 362/421; 362/528; 362/427; 362/428
(58) Field of Search .................... 362/528–530, 362/515, 421, 427, 287, 428

(56) References Cited

U.S. PATENT DOCUMENTS 5,508,896 A * 4/1996 Suehiro et al. .............. 362/460
6,796,693 B2 * 9/2004 Clinch et al. ................ 362/512

FOREIGN PATENT DOCUMENTS

| EP | 0 605 172 | 7/1994 |
| FR | 2 619 539 | 2/1989 |
| FR | 2 654 186 | 5/1991 |

* cited by examiner

Primary Examiner—Thomas M. Sember
Assistant Examiner—James W Cranson, Jr.
(74) Attorney, Agent, or Firm—Morgan & Finnegan, LLP

(57) ABSTRACT

Lamp unit for a motor vehicle of the type including at least one housing into which is inserted a lighting module which is fixed in the housing by means of at least one pivot element incorporating a rod of substantially horizontal axial orientation, carried by the housing, of which a spherical head is housed in a capsule integral with the lighting module, wherein it includes at least one retaining enclosure which is traversed by at least part of the rod, which is carried by a wall of the housing, and in which a seating receives the capsule supported vertically substantially aligned with the spherical head, so that the weight of the lighting module bears on the housing, and in that a sidewall of the enclosure has two flanges which are received in a slideway carried by the associated wall of the housing.

23 Claims, 7 Drawing Sheets

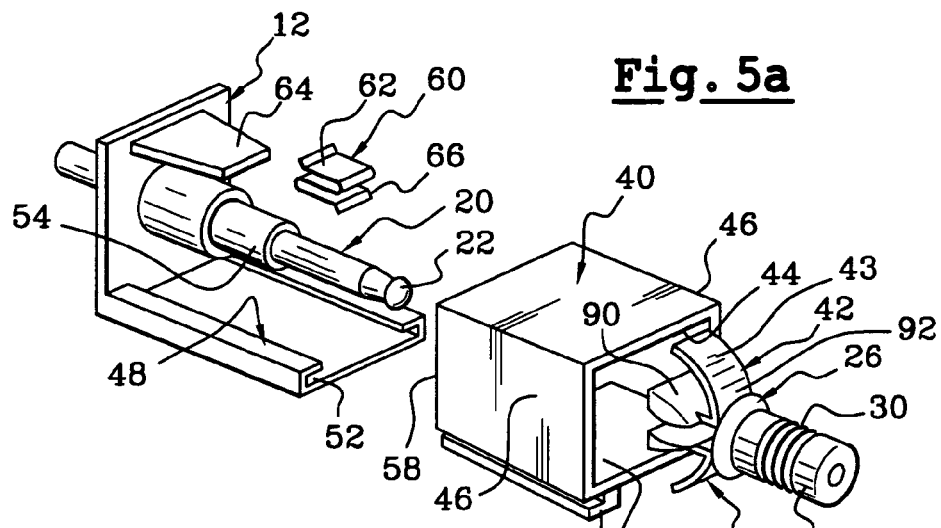
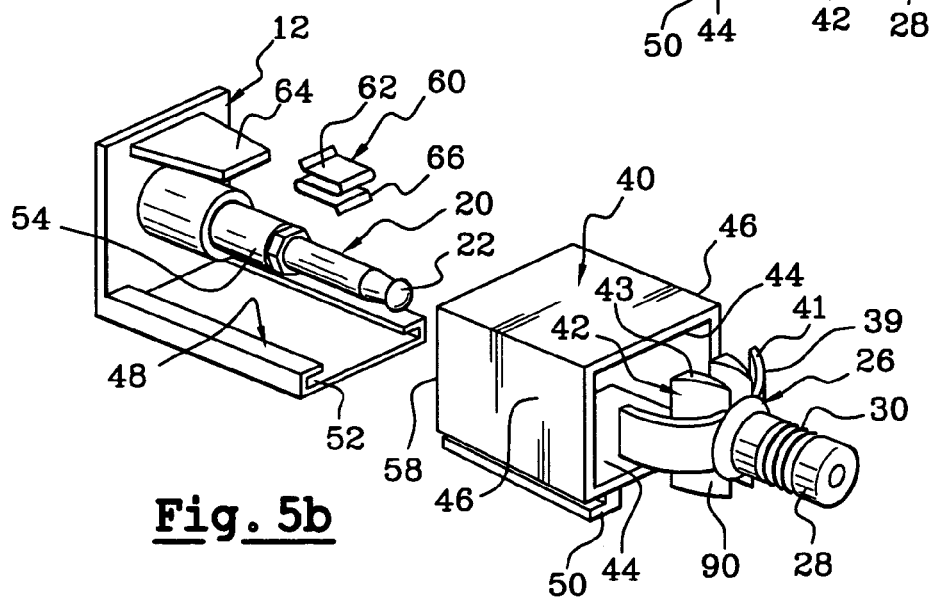
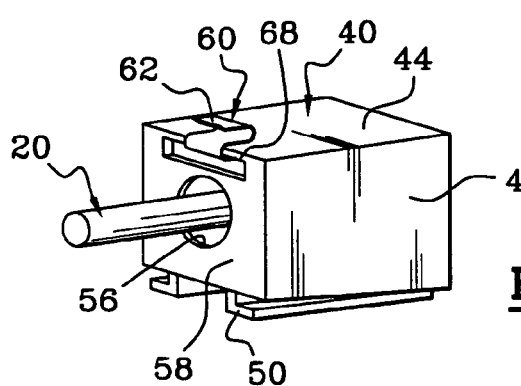

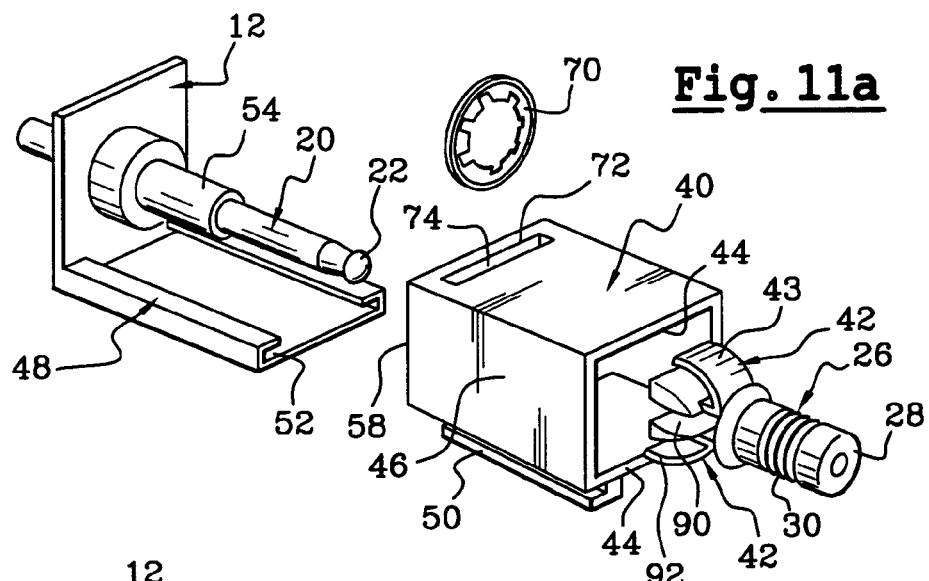
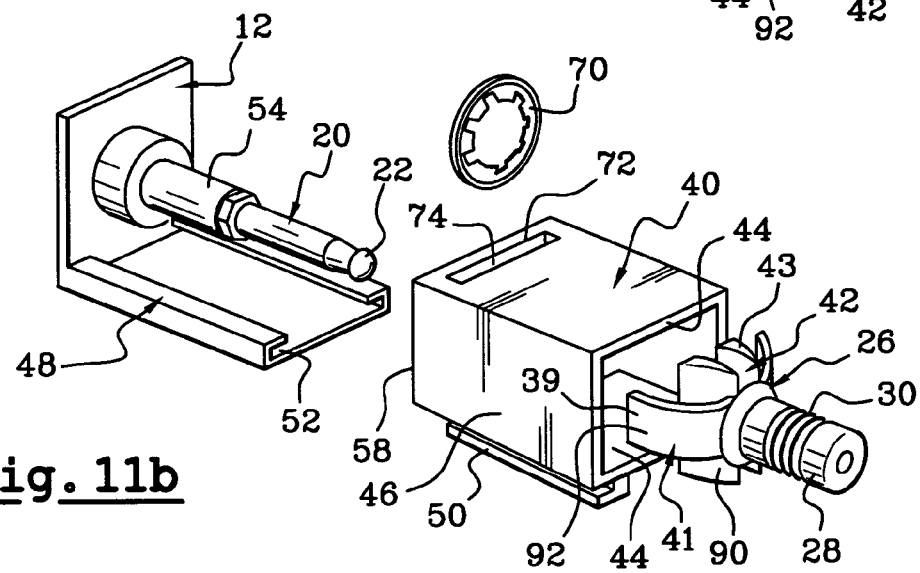
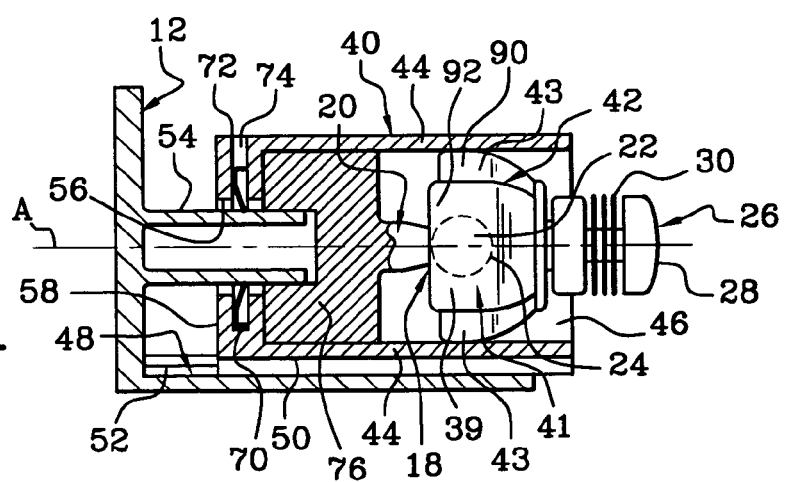

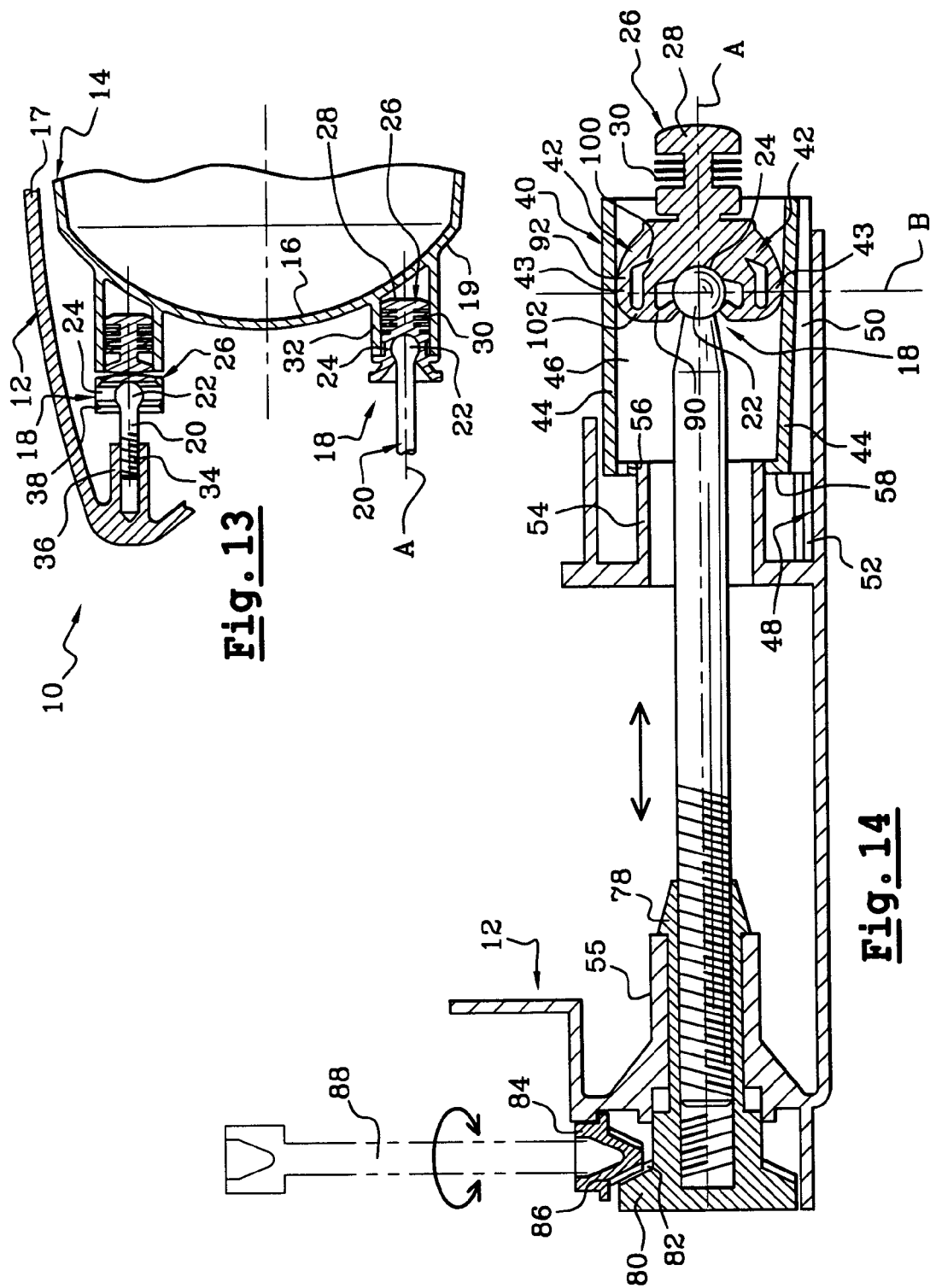

AUTOMOTIVE LAMP UNIT INCORPORATING A PIVOT ELEMENT SUPPORTED ON THE HOUSING

FIELD OF THE INVENTION

The invention relates to a lamp unit for a motor vehicle.

BACKGROUND OF THE INVENTION

The invention relates more particularly to a lamp unit for a motor vehicle, of the type including at least one housing at least open at the front and in which is mounted a lighting module, notably a reflector, of which a rear face is fixed in the housing by means of at least one pivot element incorporating a substantially horizontal rod oriented axially, supported by the housing, of which one end incorporates a spherical head housed in a counterpart seating of a capsule which is integral with the lighting module, such that the pivot element forms a ball joint enabling the lighting module to pivot in relation to the housing at least around the ball joint.

In document FR-A-2 654 186, a lamp unit is known wherein a reflector is mounted inside a housing so as to rotate relative to the latter under the effect of an actuating device. The rear wall includes an appended part extending to the outside of the housing communicating at the front with the inside of the housing via a frontal opening, and the actuating device engages with the rear end of the appended part. The rear wall also includes a bracket placed in proximity to the frontal opening and extending to the inside of a body in a substantially radial plane relative to the appended part, and whose free end is mounted so as to form an integral part of a body forming a tubular guide incorporating an axial hole in which slides an element connected on one hand to the forward end of the output rod of the actuating device and on the other hand to the mobile reflector. The purpose of such an arrangement is to permit rapid and trouble-free disassembly of the actuating device without requiring a special tool.

In virtually all existing lamp units, the lighting module is held in the housing by at least one and generally several rods of the type described previously. This means that part of the weight of lamp unit is exerted in a cantilevered manner at the end of each of these rods.

This design cannot be applied to the heavier lighting modules of the type currently developed, which weigh in the order of a kilogram.

In effect, by reason of the vibration which the vehicle undergoes in operation, a heavier weight can cause accelerated wear of the capsule, eventually damaging or even breaking the connection between the lighting module and the housing, thereby causing the lighting module to malfunction rendering it unable to perform its lighting function within acceptable safety limits.

To overcome this drawback, the invention proposes a lamp unit of the type described previously, fitted with means of reducing the overhang between the capsule and the housing.

SUMMARY OF THE INVENTION

To this end, the invention proposes a lamp unit of the type described previously, characterised in that it includes at least one retaining enclosure which is traversed by at least part of the rod, which is carried by a wall of the housing, and in which a seating receives the capsule supported vertically substantially aligned with the ball joint, so that the weight of the lighting module bears on the housing and thereby avoids having the lighting module overhanging the ball joint, and in that a sidewall of the enclosure has two flanges which are received in a slideway carried by the associated wall of the housing.

According to other characteristics of the invention:

the enclosure is hollow and shaped substantially as a parallelepiped, and the capsule includes at least two vertically opposed bearing elements which are received in the enclosure between two opposing horizontal walls of the parallelepipedic enclosure, each bearing element, in cross-section in a vertical plane parallel to the axial direction, has a bearing surface of rounded shape to allow the capsule to pivot vertically in the enclosure irrespective of the inclination of the lighting module relative to the housing, a sidewall of the enclosure is carried by an associated wall of the housing, the slideway which is carried by the associated wall of the housing is oriented parallel to the rod, the enclosure is also held in place by means of an axial tubular guide on the housing, surrounding the rod, which passes through an aperture in a vertical rear wall of the enclosure, the enclosure includes means of locking relative to the housing, the locking means include an accordion-fold fastener of which one fold is designed to ride over a projecting lug on the housing and of which another fold is designed to pass through a slot in the rear wall of the enclosure and to grip a sidewall of the enclosure located in proximity to the slot, the locking means include a fastener capable of being inserted perpendicularly to the axial direction via a slot is a sidewall of the enclosure into a seating in the enclosure which is located in alignment with the aperture in the vertical rear wall of the enclosure to grip the tubular guide of the housing, the pivot element is fixed and the rod is fixed in the tubular guide of the housing, the pivot element is fixed and the rod is carried by a parallelepipedic element inserted into the enclosure, the capsule includes at least two additional horizontally opposed retaining elements which are inserted into the enclosure between two opposite vertical walls of the parallelepipedic enclosure, each additional retaining element, in cross-section in a horizontal plane parallel to the axial direction, has a retaining surface of rounded shape to allow the capsule to pivot horizontally in the enclosure irrespective of the inclination of the lighting module relative to the housing, the pivot element is mobile, the capsule is fixed axially and free in rotation relative to the mobile enclosure, and the rod is mounted so as to slide through the tubular guide on the housing, the pivot element is mobile, the capsule is slidably mobile in the axial direction and free in rotation relative to the fixed enclosure, and the rod is mounted so as to slide through the tubular guide on the housing, the enclosure presents a substantially rectangular transverse cross-section with a horizontal dimension greater than its vertical dimension and the capsule includes at least two opposing rigid lugs of a size corresponding to the vertical dimension and two opposing flexible lugs of a size corresponding to the horizontal dimension, the rigid lugs constitute the bearing elements and the flexible lugs constitute the retaining elements, to form the fixed pivoting element, the flexible lugs constitute the bearing elements, the rigid lugs being inserted loosely into the enclosure, to form the mobile pivoting element, the capsule includes four rigid lugs arranged in opposing pairs relative to the seating, of which the opposing sides delineate a channel forming the seating, the opposing sides of the rigid lugs delineating the channel incorporate tabs at their free ends which are turned towards the inside of the channel to immobilise the spherical head of the rod, each flexible lug is formed into the shape of a blade of which one end is integral with the capsule, each flexible lug is formed into an arch shape of which both ends are integral with the capsule, one of them notably being integral with the adjacent rigid lug, the flexible lugs and the rigid lugs are of a piece with the material of the capsule.

Other characteristics and advantages of the invention will become apparent upon reading the following detailed description, for a complete understanding of which reference should be made to the attached drawings wherein:

BRIEF DESCRIPTION OF THE DRAWINGS

FIG. 5a is a front perspective exploded view of the mobile pivot element in FIG. 1;

FIG. 5b is a front perspective exploded view of the fixed pivot element in FIG. 2;

FIG. 6 is a rear perspective assembled view of the mobile pivot element in FIG. 1;

FIG. 11a is a front perspective exploded view of the mobile pivot element in FIG. 7;

FIG. 11b is a front perspective exploded view of the fixed pivot element in FIG. 8;

FIG. 12 is an axial cross-sectional view of a third embodiment of the fixed pivot element between a lighting module and a housing for a lamp unit according to the invention;

FIG. 13 is an axial sectional view of the pivot elements of a lamp unit according to a previous state of the art;

FIG. 14 is an axial sectional view of the adjustment means of the rod in relation to the housing in a third embodiment of the mobile pivot element.

DESCRIPTION OF THE PREFERRED EMBODIMENTS

Figure 1:
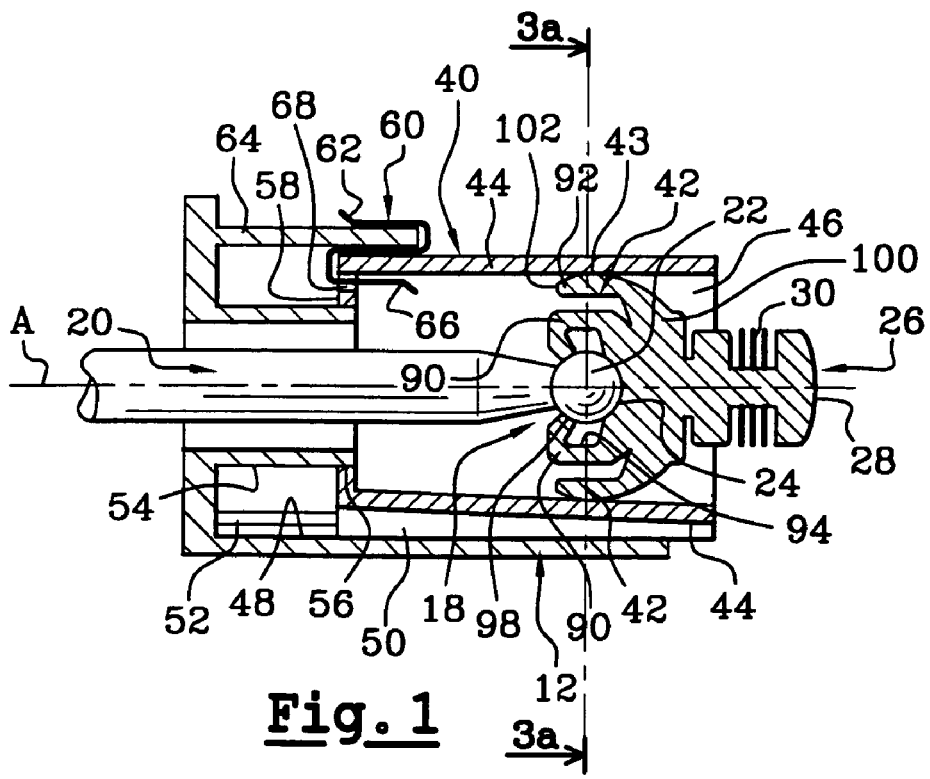
FIG. 1 is an axial cross-sectional view of a first embodiment of the mobile pivot element interposed between a lighting module and a housing for a lamp unit according to the invention.

In the following description, identical reference numbers designate components that are identical or have similar functions.

By convention, the terms "front" and "rear" respectively designate elements or positions oriented respectively towards the left and right of the Figures.

FIG. 13 presents an overall illustration of a conventional lamp unit 10 for a motor vehicle.

In a known manner, the lamp unit 10 includes at least one housing 12 which is at least open at its front end 17 and inside which is mounted a lighting module 14, for example a reflector incorporating a reflective surface 16.

A rear face 19 of the lighting module 14 is fixed in the housing 12 by means of at least one pivot element 18 in two parts including a rod 20 of substantially horizontal axial orientation, carried by the housing 14, of which one end incorporating a spherical head 22 is inserted into a counterpart seating 24 of a capsule 26 which is integral with the lighting module 14.

In the example illustrated in FIG. 13, the lighting module 14 is attached to the housing 12 by means of two lower and upper pivot elements 18. The rod 20 of the lower pivot element 18 is, for example, slidably mobile on its axis "A" and its spherical head 22 is housed in a seating 24, also spherical, in the associated capsule 26 of which one opposite end 28 incorporating tabs 30 is inserted into a tubular guide 32 moulded into the body of the lighting module 14. The upper pivot element 18 has a substantially similar configuration, with the difference that its rod 20 is fixed, that its opposite end 34 relative to the spherical head 22 is screwed into a tubular guide 36 moulded into the body of the housing 12, and that the seating 24 in the capsule 26 takes the form of a slot between the vertical flanges 38 of which the spherical head 22 on the rod 20 is inserted.

In this manner, the pivot element 26 forms a ball joint enabling the lighting module 14 to pivot in relation to the housing 12 at least around the ball joint, to adjust the inclination and/or orientation of the module 14.

A major drawback of this design is that it is restricted to a lighting module 14 of limited weight. In effect, it has been found that mounting a lighting module of increased weight, i.e. a weight greater than or equal to one kilogram, in such a cantilever arrangement relative to the housing 12, causes at least the development of play between the spherical head 22 and the seating 24 of the capsule 26, and even failure of the capsule 26. This play or failure, combined with the vibration to which the vehicle is subjected in operation, does not permit a satisfactory adjustment of the lighting module 14 to be maintained, which is particularly detrimental in terms of safety.

To overcome this drawback, as illustrated in FIGS. 1 to 12 and FIG. 14, the invention proposes a lamp unit 10 of the type described previously, characterised in that it includes at least one retaining enclosure 40 which is traversed by at least part of the rod 20, which is supported on a wall of the housing 12, and in which a seating receives the capsule 26 bearing vertically and substantially against the ball joint formed by the spherical head 22 and the seating 24, so that the weight of the lighting module 14 is transferred to the housing 12 and to avoid the lighting module 14 overhanging the ball joint formed by the spherical head 22 and the seating 24.

According to the invention, the enclosure 40 is hollow and substantially parallelepipedic in shape, and includes four sidewalls of which two are horizontal walls 44 and two are vertical walls 46 in opposing pairs. In a general manner, the capsule 26 includes two vertically opposing bearing elements 42, which are received in the enclosure 40 between the two opposing horizontal walls 44 of the parallelepipedic enclosure 40. This configuration allows the weight of the lighting module 14 to be transmitted to the enclosure 40, and therefore to the housing 12, via the bearing elements 42.

Advantageously, each bearing element 42 presents, in cross-section in a vertical plane parallel to the axial direction, which corresponds to the plane of FIGS. 1, 2, 7, 8, 12 and FIG. 14, a bearing surface 43 of rounded shape allowing the capsule 26 to pivot vertically around the ball joint in the enclosure 40 irrespective of the inclination of the lighting module 14 relative to the housing 12.

More particularly, the rounded form of the bearing surfaces 43 of the bearing elements 42 allows the capsule 26 to incline in the vertical plane around the ball joint to adjust the height of the light beam from the lighting module 14, and also allows the capsule 26 to pivot around a theoretical vertical axis "B", shown in FIG. 14, passing substantially through the centre of the spherical head 22, permitting orientation of the lighting module in a transverse plane perpendicular to the plane of the Figures.

All known means can be used to render the enclosure 40 integral with the housing. However, in the preferred embodiment of the invention, one sidewall of the enclosure 40 is supported by an associated wall 48 of the housing 12. This sidewall may be formed by a horizontal wall 44 or a vertical wall 46 of the parallelepipedic enclosure 40.

More particularly, as illustrated in FIGS. 1 to 12 and FIG. 14, the sidewall of the enclosure 40 which is designed to be carried by the wall 48 of the housing 12 incorporates two flanges 50 each having a cross-section substantially in the form of an inverted "L" and which are received in a slideway 52 carried by the associated wall 48 of the housing 12 and oriented parallel to the rod 20.

It will be noted that the sidewall which is designed to be carried by the wall 48 of the housing is in any event of axial orientation but can be oriented equally well in a horizontal or vertical plane, and can therefore be constituted by a horizontal wall 44 or a vertical wall 46. In the Figures, this sidewall is a horizontal wall 44.

As a variant (not shown), the sidewall designed to be carried by the wall 48 can also be disposed in an intermediate manner between the vertical or horizontal, the force created by the weight of the lighting module 14 being in any event accommodated by the flanges 50 on the enclosure 40 and by the slideway 52 on the housing 12.

Advantageously, as illustrated in FIGS. 1, 2, 5a, 5b, 8, 11a, 11b, 12, and 14, the enclosure 40 is additionally held in place by means of an axial tubular guide 54 on the housing 12 which surrounds the rod 20 and passes through an aperture 56 in a rear vertical wall 58 of the enclosure 40. This configuration makes it possible to propose additional alignment means for the enclosure 40.

The pivot elements 18 between the lighting module 14 and the housing 12 can be fixed or mobile axially to suit the adjustment requirements of the lighting module 14. Thus, generally, a housing 12 is fixed by means of at least one axially fixed element 18 and at least one axially mobile element 18.

According to a first embodiment of a mobile pivot element 18 which is illustrated in FIGS. 1, 3a, 4, 5a, 6, and 14, the enclosure 40 includes means of locking relative to the housing 12. In this configuration, the capsule 26 is slidably mobile in the axial direction and free in rotation relative to the fixed enclosure 40, and the rod 20, slidably mounted through the tubular guide 54 on the housing 12, allows the capsule 26 to be moved in the fixed enclosure 40 between the walls 44.

To lock the enclosure 40 relative to the housing 12, the locking means include an accordion-fold fastener 60 of which one fold 62 is designed to ride over a projecting lug 64 on the housing and of which another fold 66 is designed to pass through a slot 68 in the rear wall 58 of the enclosure 40 and to grip a sidewall of the enclosure located in proximity to the slot 68, for example and in a manner not limitative of the invention, one of the walls 44.

Figure 2:
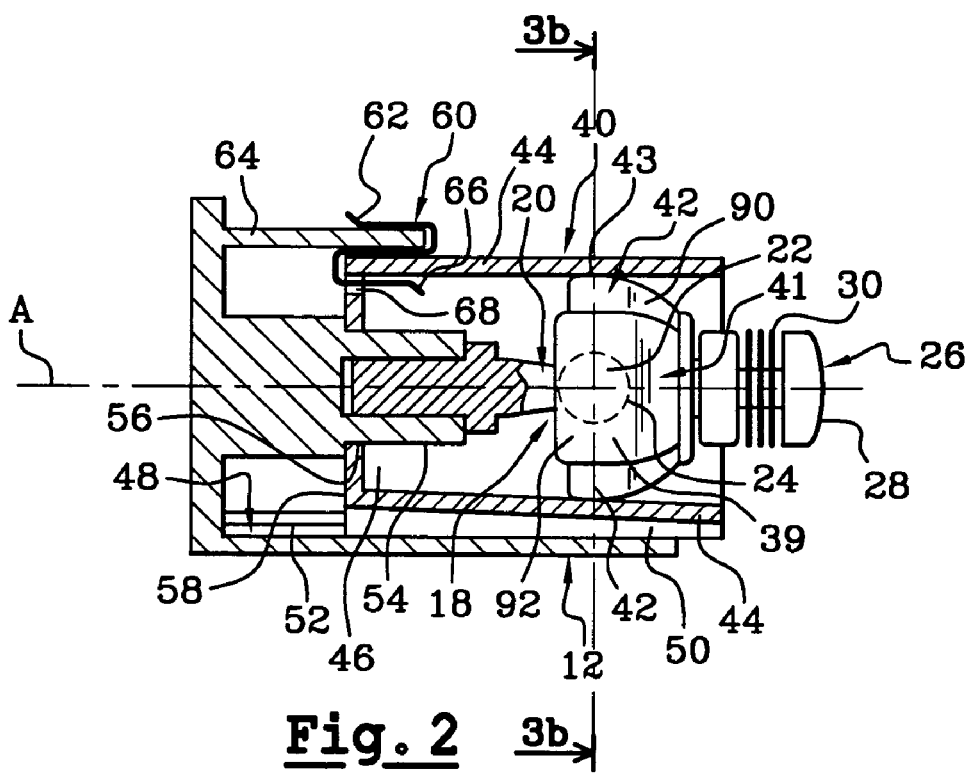
FIG. 2 is an axial cross-sectional view of a first embodiment of the mobile pivot element interposed between a lighting module and a housing for a lamp unit according to the invention.
Figure 3A:
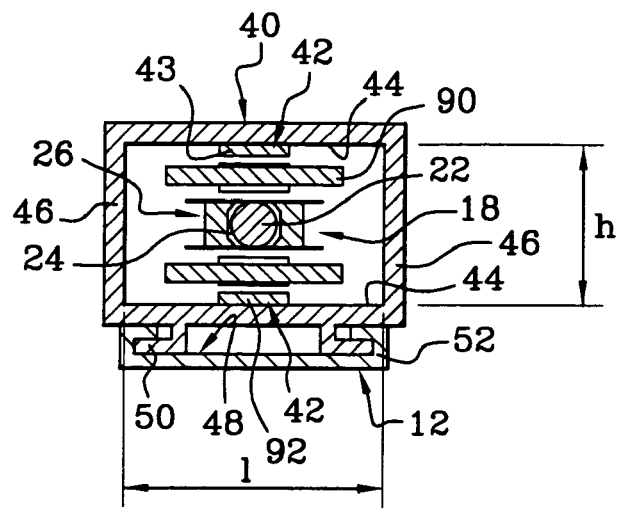
FIG. 3a is a transverse sectional view on 3a—3a in FIG. 1 of the mobile pivot element in FIG. 1.
Figure 3B:
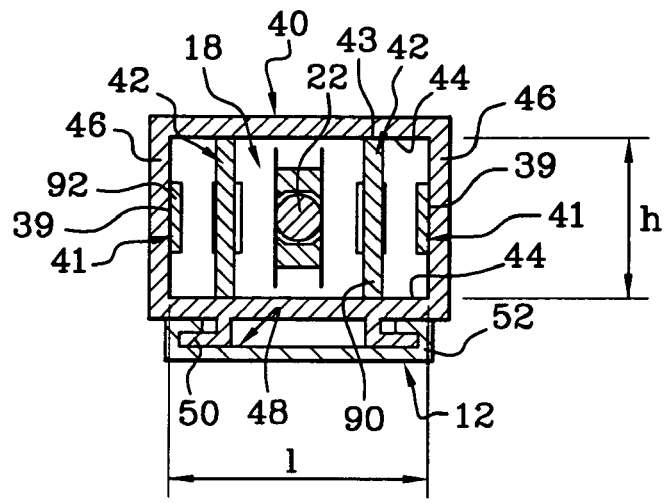
FIG. 3b is a transverse sectional view on 3b—3b in FIG. 2 of the mobile pivot element in FIG. 2.
Figure 4:
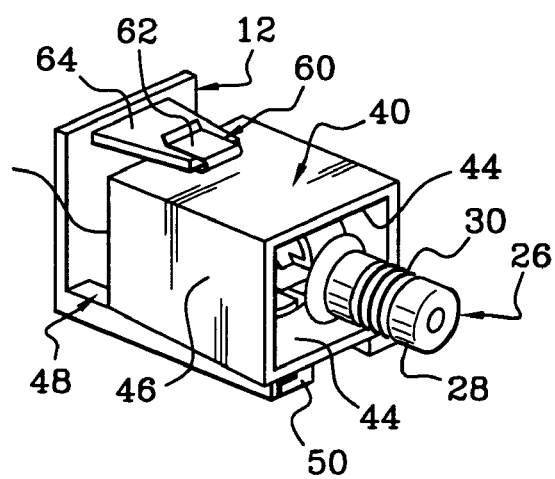
FIG. 4 is a front perspective assembled view of the mobile pivot element in FIG. 1.
Figure 7:
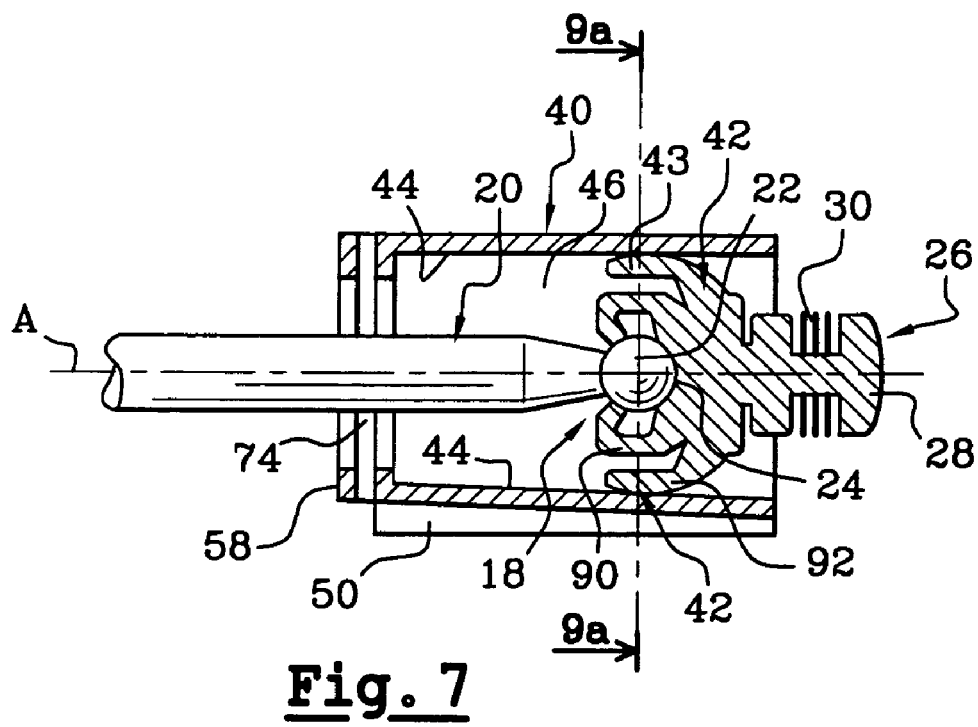
FIG. 7 is an axial cross-sectional view of a second embodiment of the mobile pivot element interposed between a lighting module and a housing for a lamp unit according to the invention.

According to a first embodiment of a fixed pivot element 18 as shown in FIGS. 2, 3b, and 5b, the enclosure 40 incorporates means of locking relative to the housing 12 and the rod 20 is fixed, notably by screwing into the tubular guide 54 on the housing 12.

It is to be understood that, as a variant, the rod 20 can be force fitted into the tubular guide 54 of the housing 12.

As in the first embodiment of the mobile element, the means of locking the enclosure relative to the housing includes an accordion-fold fastener 60 of which one fold 62 is designed to ride over a projecting lug 64 on the housing 12 and of which another fold 66 is designed to pass through a slot 68 in the rear wall 58 of the enclosure 40 and to press against a sidewall of the enclosure, notably a wall 44 located in proximity to the slot 68.

According to a second embodiment of a mobile pivot element 18 which is illustrated in FIGS. 7, 9a, 10 and 11a, the enclosure 40 also includes means of locking relative to the housing 12. In this configuration, the capsule 26 is slidably mobile in the axial direction and free in rotation relative to the fixed enclosure 40, and the rod 20, slidably mounted through the tubular guide 54 on the housing, allows the capsule 26 to be moved in the fixed enclosure 40 between the walls 44.

To lock the enclosure 40 relative to the housing 12, the locking means differ from the previous locking means in that they incorporate a fastener 70 capable of being inserted perpendicularly to the axial direction via a slot 72 in a sidewall of the enclosure, for example but not limitatively a wall 44 in a seating 74 of the enclosure which is aligned with the aperture 56 in the rear vertical wall 58 of the enclosure 40 to grip the tubular guide 54 on the housing 12. In the Figures, the fastener 70 is constituted by a deformable washer 70, but it is to be understood that a tab engaging with a groove (not shown) located on the tubular guide 54 could serve equally well in this embodiment of the invention.

Figure 8:
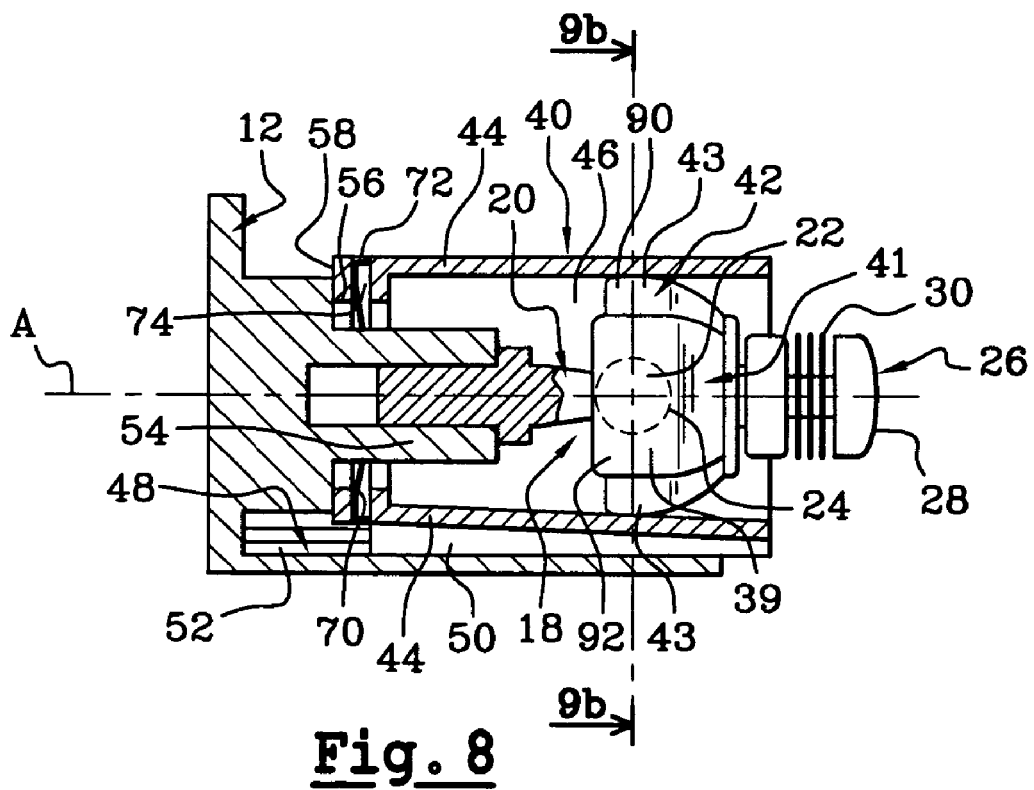
FIG. 8 is an axial cross-sectional view of a second embodiment of the fixed pivot element between a lighting module and a housing for a lamp unit according to the invention.
Figure 9A:
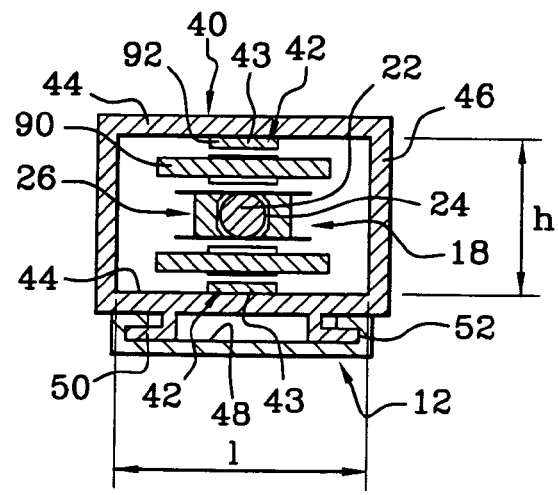
FIG. 9a is a transverse sectional view on 9a—9a in FIG. 7 of the mobile pivot element in FIG. 7.
Figure 9B:
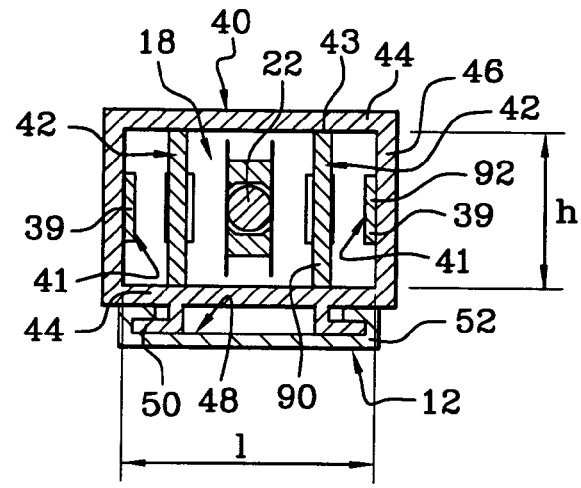
FIG. 9b is a transverse sectional view on 9b—9b in FIG. 8 of the fixed pivot element in FIG. 8.
Figure 10:
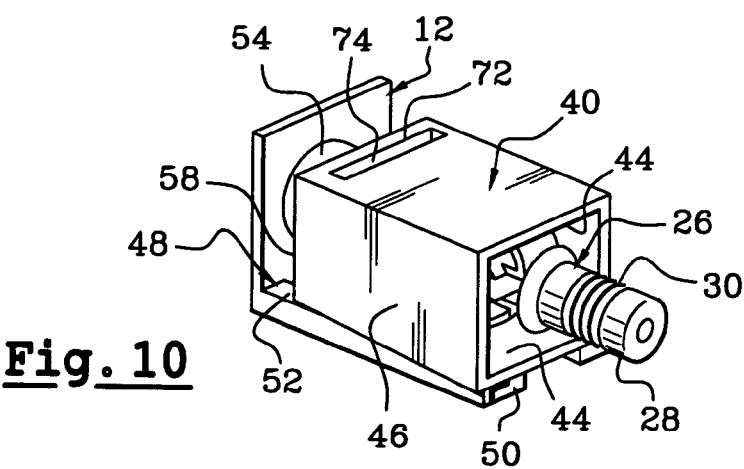
FIG. 10 is a front perspective assembled view of the mobile pivot element in FIG. 7.

According to a second embodiment of a fixed pivot element 18 as shown in FIGS. 8, 9b and 11b, the enclosure 40 also incorporates means of locking relative to the housing 12 and the rod 20 is fixed, notably by screwing, into the tubular guide 54 on the housing.

As in the second embodiment of the mobile element, the means of locking the enclosure relative to the housing incorporate a fastener 70, notably a deformable washer 70, capable of being inserted perpendicularly to the axial direction via a slot 72 in a sidewall of the enclosure, for example a wall 44, into a seating 74 of the enclosure 40 which is aligned with the aperture 56 in the rear vertical wall 58 of the enclosure 40 to grip the tubular guide 54 on the housing 12. Here again, a tab could be used in place of the deformable washer constituting the fastener 70.

In a third embodiment of a mobile pivot element 18 as illustrated in FIG. 14, the enclosure 40 does not include means of locking relative to the housing 12. In this configuration, the capsule 26 is slidably fixed in the axial direction and free in rotation relative to the enclosure which is mobile, and any known means can be used to immobilise the capsule 26 between the walls 44 of the enclosure 40.

The rod 20, slidably mounted through the tubular guide 54 on the housing, allows the flanges 50 of the enclosure 40 to be moved along the slideway 52.

To move the rod 20, it is, for example, screwed by means of a reversible thread into a bushing 78 which is itself rotatably mounted in a seating 55 located behind the guide 54, and which passes through the casing 12 at the level of this seating 55. Outside the housing 12, an outer edge 80 of the bushing 78 carries a set of teeth 82 which engages with a set of teeth 86 in a sprocket 84 of radial axis perpendicular to the rod 20. Actuation of the radial sprocket 84, for example by means of a spindle 88 shown dotted, causes the bushing 78 to rotate and the rod 20 to screw in or out of the bushing 78, thereby imparting linear motion to the rod 20.

In the embodiment illustrated in FIG. 14, for reasons of legibility of the Figure, the seating 55 on the enclosure 40 is separate from the tubular guide 54, but it is to be understood that the enclosure 40 can obviously be slidably mounted on a single tubular guide of suitable length.

Also, in a third embodiment of a fixed pivot element 18 as shown in FIG. 12, the enclosure 40 includes means of locking relative to the housing 12. In this particular embodiment, the rod 20 is not carried directly by the housing 12 but indirectly via a parallelepipedic element 76 which is inserted into the enclosure 40.

To lock the enclosure 40 relative to the housing, the locking means include a fastener 70 capable of being inserted perpendicularly to the axial direction via a slot 72 in a sidewall 44 of the enclosure 40 into a seating 74 in the enclosure 40 which is aligned with the aperture 56 in the vertical rear wall 58 of the enclosure 40 to grip the tubular guide 54 on the housing 12.

It is to be understood that, in this embodiment, the locking means could include an accordion-fold fastener 60 of the type previously described in reference to FIG. 2 without changing the nature of the invention.

According to the invention, the capsule 26, when it is designed to implement a mobile pivot element 18 as shown in FIGS. 1, 3a, 4, 5a, 6, 7, 9a, 10, 11a and 14, is only in contact with the enclosure 40 via its vertically opposed bearing elements 42 which are at least two in number.

However, when it is designed to implement a fixed pivot element 18 as shown in FIGS. 2, 3b, 5b, 8, 9b, 11b and 12, the capsule 26 is in contact with the enclosure via its two bearing elements 42 and via at least two horizontally opposed retaining elements 41.

In effect, the capsule includes at least two additional horizontally opposed retaining elements 41 which are inserted into the enclosure 40 between two opposite vertical walls 46 of the parallelepipedic enclosure 40. If the capsule 26 is designed to implement a fixed pivot element 18, these at least two additional retaining elements 41 are inserted with no play in contact with the opposing vertical walls 46 of the parallelepipedic enclosure 40. However, if the capsule 26 is intended to implement a mobile pivot element 18, these at least two additional retaining elements 41 are inserted with play between the opposing vertical walls 46 of the parallelepipedic enclosure 40, and not in contact with them.

To ensure that the capsule 26 is secured in a satisfactory manner when it is intended to implement a fixed pivot element 18, each additional retaining element 41 incorporates, in cross-section on a horizontal plane parallel to the axial direction, a retaining surface 39 of rounded shape allowing the capsule 26 to rotate horizontally in the enclosure 40 irrespective of the orientation of the lighting module 14 relative to the housing 12. This retaining surface 39 is not used when the capsule 26 is intended to implement a mobile pivot element 18.

The invention has a notable advantage over designs derived from the existing state of the art in that it proposes a single form of capsule 26 equally adapted to the implementation of a fixed pivot element 18 or a mobile pivot element 18. As will be seen in the remainder of this description, adaptation of the capsule 26 to the desired type of pivot arrangement is achieved by using the capsule in a given angular position or in another position perpendicular to it and which is obtained by rotating the capsule 26.

To this end, according to the invention and as shown in FIGS. 3a, 3b, 9a and 9b, the enclosure 40 has a substantially rectangular transverse cross-section of horizontal dimension "I" greater than its vertical dimension "h" and the capsule 26 incorporates at least two opposing rigid lugs 90 of a size corresponding to the vertical dimension "h" and two opposing flexible lugs 92 of a size corresponding to the horizontal dimension "I".

According to the invention, when the capsule is intended to implement a fixed pivot element 18 as shown in FIGS. 2, 3b, 5b, 8, 9b, 11b and 12, the at least two rigid lugs 90 form the bearing elements 42 and the flexible lugs 92 form the retaining elements 41.

In this configuration, the capsule 26 is inserted into the enclosure 40 in a manner such that the rigid lugs 90 are oriented vertically and the flexible lugs 92 are oriented horizontally. To this end, the rigid lugs 90 incorporate the bearing surfaces 43 previously described which are in contact with the horizontal walls 44 and the flexible lugs 92 incorporate the retaining surfaces 39 which are in contact with the vertical walls 46.

According to the invention, when the capsule is intended to implement a mobile pivot element 18 as shown in FIGS. 1, 3a, 4, 5a, 6, 7, 9a, 10, 11a, the at least two flexible lugs 92 form the bearing elements 42 and the rigid lugs are inserted with play into the enclosure 40.

In this configuration, the capsule 26 is inserted into the enclosure 40 in a manner such that the flexible lugs 92 are oriented vertically and the rigid lugs are oriented horizontally. To this end, the flexible lugs 92 incorporate the bearing surfaces 43 previously described which are in contact with the horizontal walls 44 and the flexible [rigid?] lugs 90 are not in contact with the vertical walls 46.

Thus, the same capsule 26 can be associated equally well with the implementation of a fixed pivot element 18 or to the implementation of a mobile pivot element 18. To achieve this, all that is required is to pivot the capsule 26 through 90 degrees depending on the desired use.

In the preferred embodiment of the invention, the capsule includes four rigid lugs 90 arranged in opposite pairs in relation to the seating 24, of which the opposite sides 94 delineate a channel 24 forming the seating 24.

Advantageously, as illustrated in FIG. 1, the opposing sides 94 of the rigid lugs 90 delineating the channel 24 incorporate tabs 98 at their free ends 96 which are turned towards the inside of the channel 24 to immobilise the spherical head 22 of the rod 20.

Several embodiments can be envisaged for implementation of the flexible lugs 92.

Thus, in one embodiment of the capsule 26 as shown in FIGS. 1 to 12, each flexible lug 92 is shaped in the form of a rounded blade which forms, depending on the use of the capsule 26, the bearing surface 43 or the retaining surface 39, and of which one end 100 is integral with the capsule 26, the other end 102 of the flexible lug 92 remaining free.

In another embodiment of the capsule 26 as shown in FIG. 14, each flexible lug 92 is shaped in the form of an arc of which both ends 100, 102 are integral with the capsule 26. Advantageously, the end 102 can notably be integral with the adjacent rigid lug 90. In this manner, each flexible lug 92 can be deformed elastically towards the axis "A" when it is introduced into the enclosure 40. Furthermore, the arc-shaped profile of each flexible lug 92 allows an effectively point contact between the lug 92 and the associated horizontal or vertical wall 44, 46 of the enclosure 40, which facilitates the pivoting action of the capsule in the enclosure 40 enabling adjustment of the lighting module 14. This configuration is obviously transposable to all of the capsules described previously.

Finally it will be noted that, preferably, the flexible lugs 92 and the rigid lugs 90 are of a piece with the material of the capsule 26 which is made, for example, by moulding a plastic material.

The invention therefore proposes a lamp mounting assembly which eliminates any risk of failure of the pivot elements 18.

What is claimed is:

1. A lamp unit for a motor vehicle, of the type including at least one housing at least open at the front and in which is mounted a lighting module, notably a reflector, of which a rear face is fixed in the housing by means of at least one pivot element incorporating a substantially horizontal rod oriented axially, supported by the housing, of which one end incorporates a spherical head housed in a counterpart seating of a capsule which is integral with the lighting module, such that the pivot element forms a ball joint composed of the spherical head and the seating, enabling the lighting module to pivot in relation to the housing at least around the ball joint,
   wherein it includes at least one retaining enclosure which is traversed by at least part of the rod, which is carried by a wall of the housing, and in which a seating receives the capsule supported vertically substantially aligned with the ball joint, so that the weight of the lighting module bears on the housing and thereby avoids having the lighting module overhanging the ball joint, and a sidewall of the enclosure has two flanges which are received in a slideway carried by the associated wall of the housing.

2. Lamp unit according to claim 1, wherein the enclosure is hollow and shaped substantially as a parallelepiped, and in that the capsule includes at least two vertically opposed bearing elements which are received in the enclosure between two opposing horizontal walls of the parallelepipedic enclosure.

3. Lamp unit according to claim 2, wherein each bearing element, in cross-section in a vertical plane parallel to the axial direction, has a bearing surface of rounded shape to allow the capsule to pivot vertically in the enclosure irrespective of the inclination of the lighting module relative to the housing.

4. Lamp unit according to claim 1, wherein a sidewall of the enclosure is carried by an associated wall of the housing.

5. Lamp unit according to claim 4, wherein the slideway which is carried by the associated wall of the housing is oriented parallel to the rod.

6. Lamp unit according to claim 5, wherein the enclosure is also held in place by means of an axial tubular guide on the housing, surrounding the rod, which passes through an aperture in a vertical rear wall of the enclosure.

7. Lamp unit according to claim 5, wherein the enclosure includes means of locking relative to the housing.

8. Lamp unit according to claim 7, wherein the locking means include an accordion-fold fastener of which one fold is designed to ride over a projecting lug on the housing and of which another fold is designed to pass through a slot in the rear wall of the enclosure and to grip a sidewall of the enclosure located in proximity to the slot.

9. Lamp unit according to claim 7 wherein the enclosure is also held in place by means of an axial tubular guide on the housing, surrounding the rod, which passes through an aperture in a vertical rear wall of the enclosure and wherein the locking means include a fastener capable of being inserted perpendicularly to the axial direction via a slot in a sidewall of the enclosure into a seating in the enclosure which is aligned with the aperture in the vertical rear wall of the enclosure to grip the tubular guide on the housing.

10. Lamp unit according to claim 8, wherein the enclosure is also held in place by means of an axial tubular guide on the housing, surrounding the rod, which passes through an aperture in a vertical rear wall of the enclosure, wherein the enclosure includes means of locking relative to the housing and wherein the pivot element is fixed and in that the rod is fixed in the tubular guide on the housing.

11. Lamp unit according to claim 8, wherein the enclosure is also held in place by means of an axial tubular guide on the housing, surrounding the rod, which passes through an aperture in a vertical rear wall of the enclosure, wherein the enclosure includes means of locking relative to the housing and wherein the pivot element is fixed and the rod is carried by a parallelepipedic element which is inserted into the enclosure.

12. Lamp unit according to claim 10, wherein the capsule includes at least two additional horizontally opposed bearing elements which are received in the enclosure between two vertically opposed walls of the parallelepipedic enclosure.

13. Lamp unit according to claim 12, wherein each additional retaining element, in cross-section in a horizontal plane parallel to the axial direction, has a retaining surface of rounded shape to allow the capsule to pivot horizontally in the enclosure irrespective of the inclination of the lighting module relative to the housing.

14. Lamp unit according to claim 6, wherein the pivot element is mobile, the capsule being fixed axially and free in rotation relative to the mobile enclosure, and the rod is slidably mounted through the tubular guide on the housing.

15. Lamp unit according to claim 8, wherein the enclosure is also held in place by means of an axial tubular guide on the housing, surrounding the rod, which passes through an aperture in a vertical rear wall of the enclosure, wherein the enclosure includes means of locking relative to the housing and wherein the pivot element is mobile, the capsule being slidably mobile in the axial direction and free in rotation relative to the fixed enclosure, and in that the rod is slidably mounted through the tubular guide on the housing.

16. Lamp unit according to clam 1, wherein the enclosure presents a substantially rectangular transverse cross-section with a horizontal dimension greater than its vertical dimension and in that the capsule includes at least two opposing rigid lugs of a size corresponding to the vertical dimension and two opposing flexible lugs of a size corresponding to the horizontal dimension.

17. Lamp unit according to claim 16, wherein the capsule includes at least two additional horizontally opposed bearing elements which are received in the enclosure between two vertically opposed walls of the parallelepipedic enclosure, and wherein the rigid lugs form the bearing elements and the flexible lugs form the retaining elements, to form the fixed pivot element.

18. Lamp unit according to claim 16 wherein the pivot element is mobile, the capsule being fixed axially and free in rotation relative to the mobile enclosure, and the rod is slidably mounted through the tubular guide on the housing and wherein the flexible lugs form the bearing elements, the rigid lugs being inserted with play into the enclosure, to form the mobile pivot element.

19. Lamp unit according to claim 16, wherein the capsule includes four rigid lugs arranged in opposing pairs relative to the seating, of which the opposing sides delineate a channel forming the seating.

20. Lamp unit according claim 19, wherein the opposing sides of the rigid lugs delineating the channel incorporate tabs at their free ends which are turned towards the inside of the channel to immobilise the spherical head of the rod.

21. Lamp unit according to claim 16, wherein each flexible lug is formed into the shape of a rounded blade of which only one end is integral with the capsule.

22. Lamp unit according to claim 16, wherein each flexible lug is formed into an arc shape of which both ends are integral with the capsule, one of them notably being integral with the adjacent rigid lug.

23. Lamp unit according to claim 16, wherein the flexible lugs and the rigid lugs are of a piece with the material of the capsule.

* * * * *